United States Patent [19]

Tani

[11] Patent Number: 5,095,226
[45] Date of Patent: Mar. 10, 1992

[54] DEVICE FOR OPERATING CHARGE TRANSFER DEVICE WITH DIFFERENT POWER SUPPLY VOLTAGES

[75] Inventor: Nobuhiro Tani, Tokyo, Japan

[73] Assignee: Asahi Kogaku Kogyo Kabushiki Kaisha, Tokyo, Japan

[21] Appl. No.: 557,771

[22] Filed: Jul. 26, 1990

[30] Foreign Application Priority Data

Aug. 8, 1989 [JP] Japan .................................. 1-206243
Aug. 8, 1989 [JP] Japan .................................. 1-206244

[51] Int. Cl.$^5$ ........................ H03K 3/01; G11C 19/28
[52] U.S. Cl. ............................. 307/296.1; 307/296.6; 307/269; 307/270; 377/63
[58] Field of Search ................ 377/63, 58; 307/296.1, 307/296.6, 311, 269, 270

[56] References Cited

U.S. PATENT DOCUMENTS 4,556,851 12/1985 Levine .................................. 377/63

FOREIGN PATENT DOCUMENTS 0281153 9/1988 European Pat. Off. .
3725004 3/1988 Fed. Rep. of Germany .

Primary Examiner—Stanley D. Miller
Assistant Examiner—Trong Phan
Attorney, Agent, or Firm—Sandler, Greenblum & Bernstein

[57] ABSTRACT

A device for operating a charge transfer device includes a driver for operating the charge transfer device and a power supply circuit which generates a voltage in accordance with a state in which the charge transfer device is operated. The power supply circuit includes a power supply unit and an auxiliary power supply circuit. The power supply unit generates one voltage which is supplied to the driver and another voltage, which is changed by the auxiliary power supply circuit, to an appropriate voltage to be supplied to the driver. The volume supplied by the auxiliary power supply circuit is changed from a value thereof supplied during a low speed operation of the charge transfer device, when the charge transfer device is operated at a high speed, or immediately after the charge transfer device is operated at a high speed.

21 Claims, 10 Drawing Sheets

Fig. 6
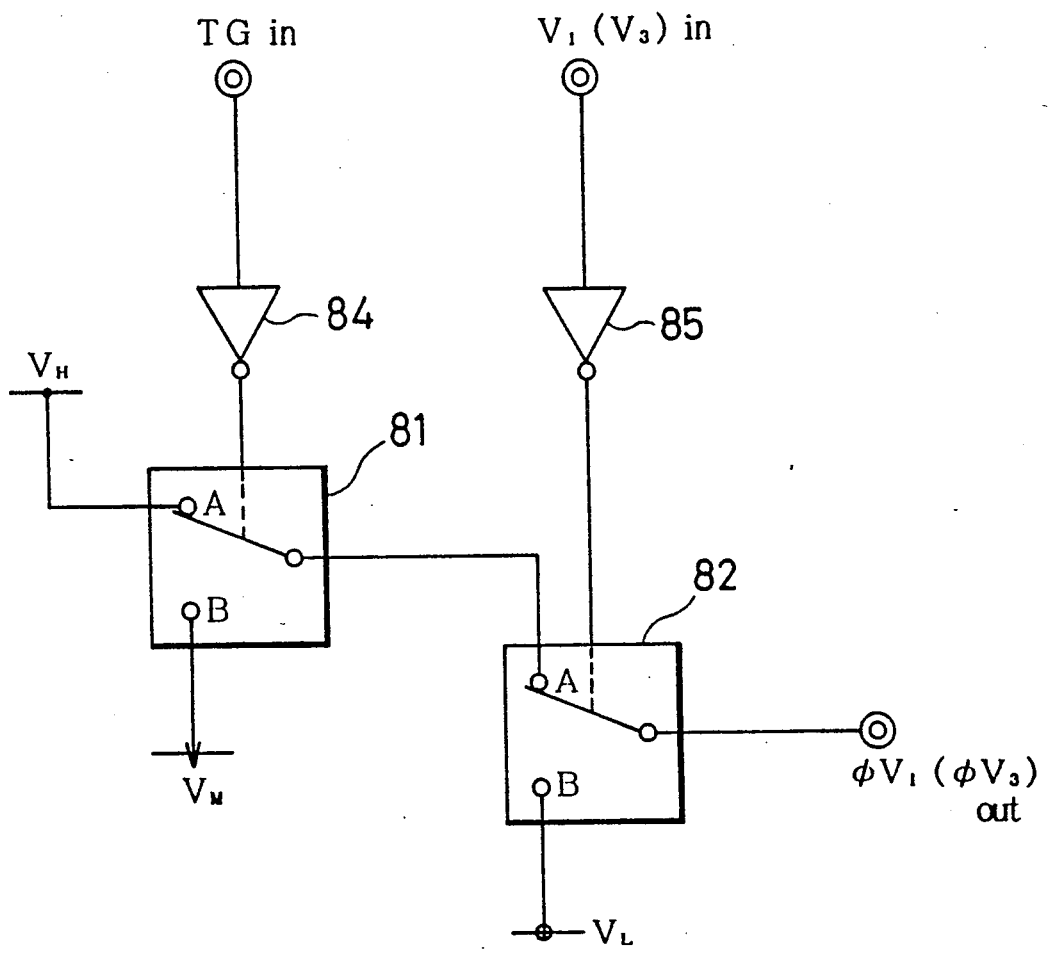
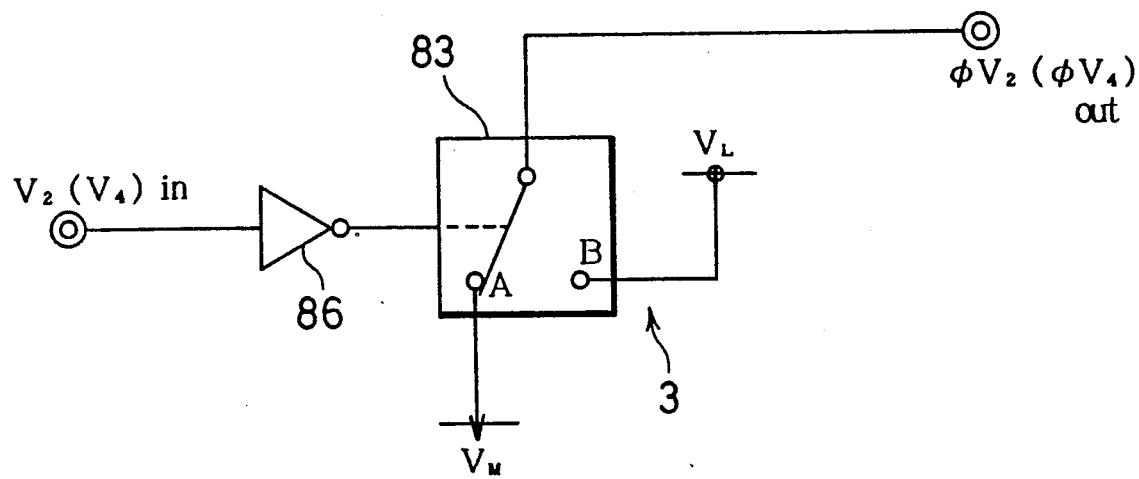

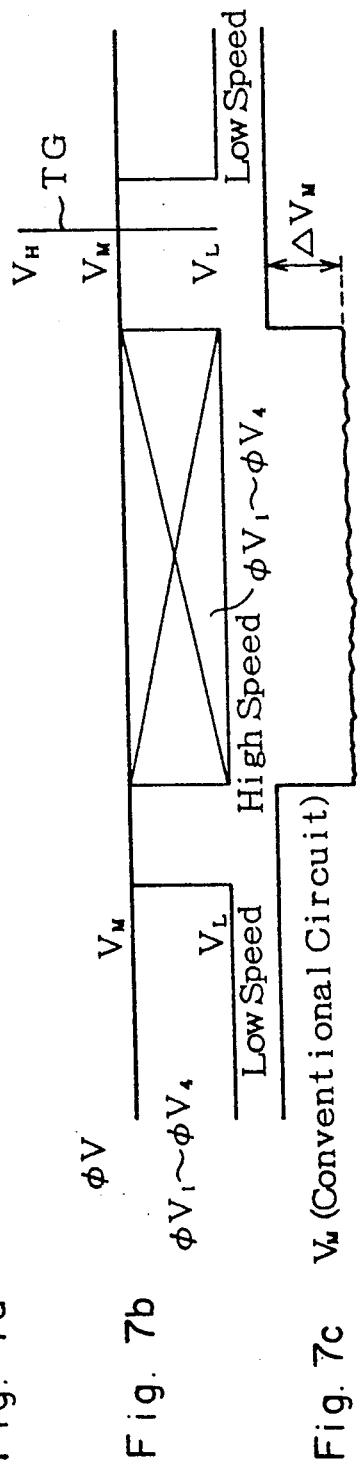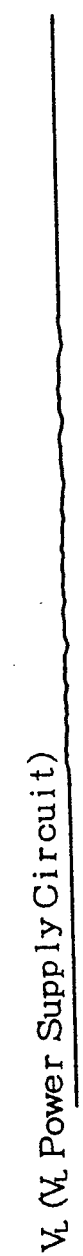
Fig. 7a  VD
Fig. 7b  φV
          φV₁~φV₄
Fig. 7c  V_M (Conventional Circuit)
Fig. 7d  P_V
Fig. 7e  V_M (V_M Power Supply Circuit)
Fig. 7f  V_L (Conventional Circuit)
Fig. 7g  V_L (V_L Power Supply Circuit)

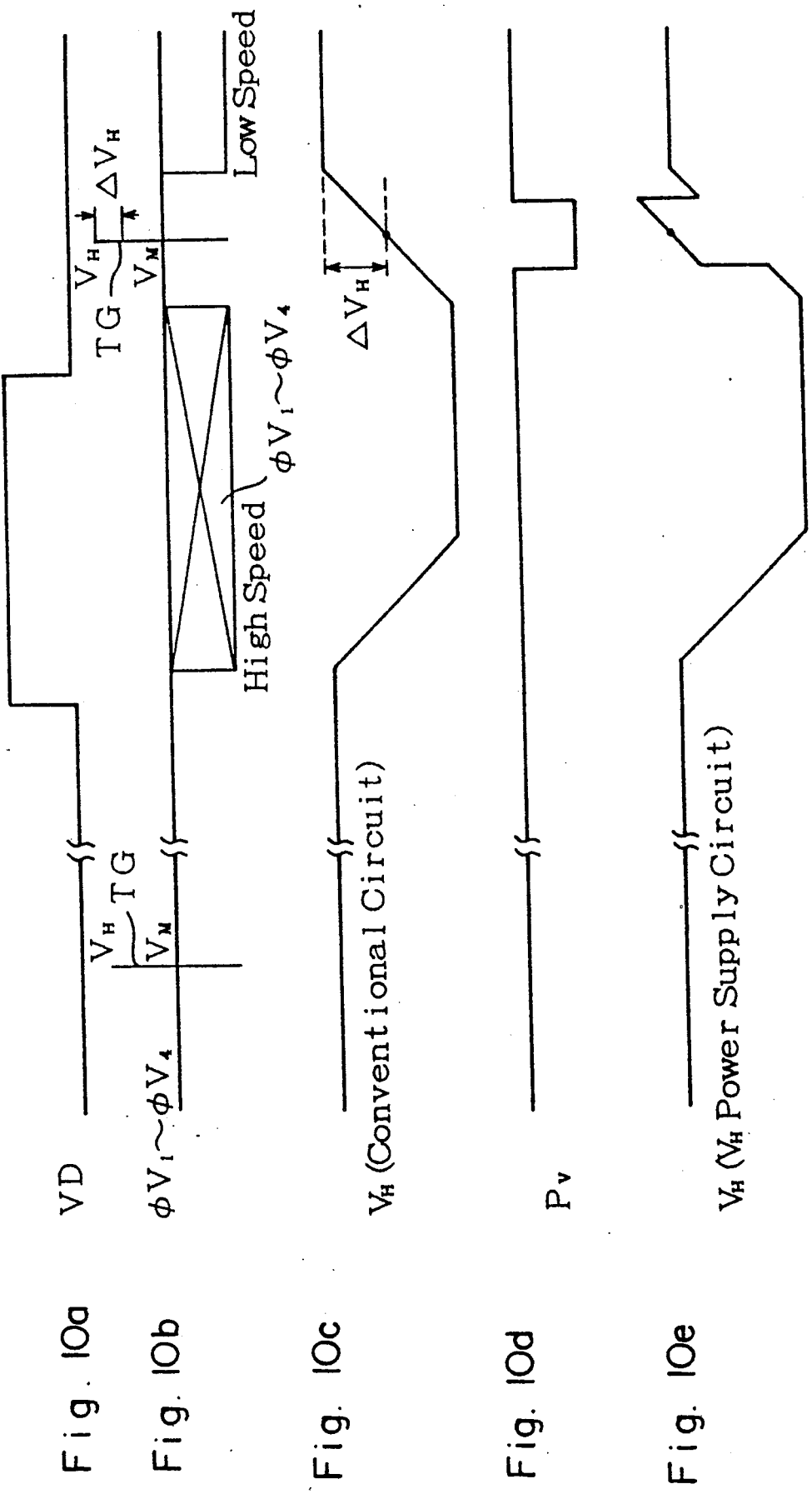

DEVICE FOR OPERATING CHARGE TRANSFER DEVICE WITH DIFFERENT POWER SUPPLY VOLTAGES

BACKGROUND OF THE INVENTION

1. Field of the Invention

The present invention relates to a device for operating a charge transfer device such as a charge couple device (CCD).

2. Description of the Related Art

Conventionally, a device for operating the charge transfer device includes a driver for outputting control signals by which the charge transfer device is operated, and a power supply circuit for applying a voltage to the driver. In the charge transfer device, a vertical transfer CCD transfers electric charges accumulated on photodiodes to a horizontal transfer CCD or a discharge drain. The electric charge transferred to the horizontal transfer CCD is transferred to a floating diffusion amplifier and changed to a voltage to be outputted as a video signal, while an unwanted electric charge is transferred to the discharge drain.

When an electronic shutter is operated, for example, only electric charges accumulated on the photodiodes during a predetermined period must be transferred from the vertical transfer CCD to the horizontal transfer CCD to form a picture or image. Therefore, electric charges accumulated during a period other than the predetermined period must be discharged from the vertical transfer CCD to the discharge drain. This discharge operation of the vertical transfer CCD must be carried out at a high speed so that the image-forming operation is not interrupted.

Nevertheless, since a large amount of electric current flows between the driver and the vertical transfer CCD when the vertical transfer CCD is operated at a high speed, a relative drop occurs in the voltage supplied to the driver. As a result, unwanted electric charges are not fully discharged to the discharge drain. Therefore, residual electric charges are superposed on electric charges corresponding to an original image. Thus, the image quality is lowered. Such a voltage change can be prevented by providing a capacitor having a large capacity, but this increases the size of the circuit.

SUMMARY OF THE INVENTION

Therefore, an object of the present invention is to provide a operating device in which the efficiency of a transfer of an electric charge during a high speed operation is improved, to thereby prevent a lowering of the image quality, without enlarging the size of the curcuit.

In the present invention, there is provided a device for operating a charge transfer device, the device comprising a driver, a power supply circuit, and a control mechanism. The driver operates the charge transfer device, in accordance with timing signals, at a low speed or at a high speed. The power supply circuit supplies a voltage to the driver, and the control mechanism controls the power supply circuit in such a manner that the voltage is changed in accordance with a state in which the charge transfer device is operated.

Further, in the present invention, there is provided a device for operating a charge transfer device, the device comprising a generating mechanism, a driver, a power supply circuit, and a control mechanism. The generating mechanism generates first and second timing signals. The driver operates the charge transfer device, in accordance with the timing signals, at a low speed or at a high speed. The power supply circuit supplies a voltage to the driver, and the control mechanism controls the power supply circuit in such a manner that the voltage is changed in accordance with a state in which the charge transfer device is operated.

Still further, in the present invention, there is provided a device for operating a charge transfer device, the device comprising a generating mechanism, a driver, a power supply circuit, and a control mechanism. The generating mechanism generates a first timing signal and a second timing signal, the driver operates the charge transfer device, in accordance with the timing signals, at a low speed or at a high speed. The power supply circuit supplies a voltage to the driver, and the control mechanism controls the power supply circuit in such a manner that the voltage is changed in accordance with a speed at which a vertical transfer CCD of the charge transfer device is operated.

Furthermore, in the present invention, there is provided a device for operating a charge transfer device, the device comprising a generating mechanism, a driver, a power supply circuit, and a control mechanism. The generating mechanism generates timing signals by which the charge transfer device is operated. The driver operates the charge transfer device in accordance with the timing signals outputted by the generating mechanism. The power supply circuit supplies a voltage to the driver, and the control mechanism controls the power supply circuit in such a manner that the voltage is changed in accordance with a state in which the charge transfer device is operated.

According to the present invention, the voltage supplied to the driver is changed in accordance with a state in which the charge transfer device is operated. Thus, the efficiency of a transfer of an electric charge is improved, preventing a lowering of the image quality, without enlarging the size of the circuit.

BRIEF DESCRIPTION OF THE DRAWINGS

The present invention will be better understood from the description of the preferred embodiments of the invention set forth below, together with the accompanying drawings, in which:

FIG. 6 is a block diagram showing a construction of a driver;

FIG. 7 (a–g) illustrates timing charts showing an operation of the first embodiment of the present invention;

FIG. 10 illustrates timing charts showing an operation of the second embodiment of the present invention.

DESCRIPTION OF THE PREFERRED EMBODIMENTS

Figure 1:
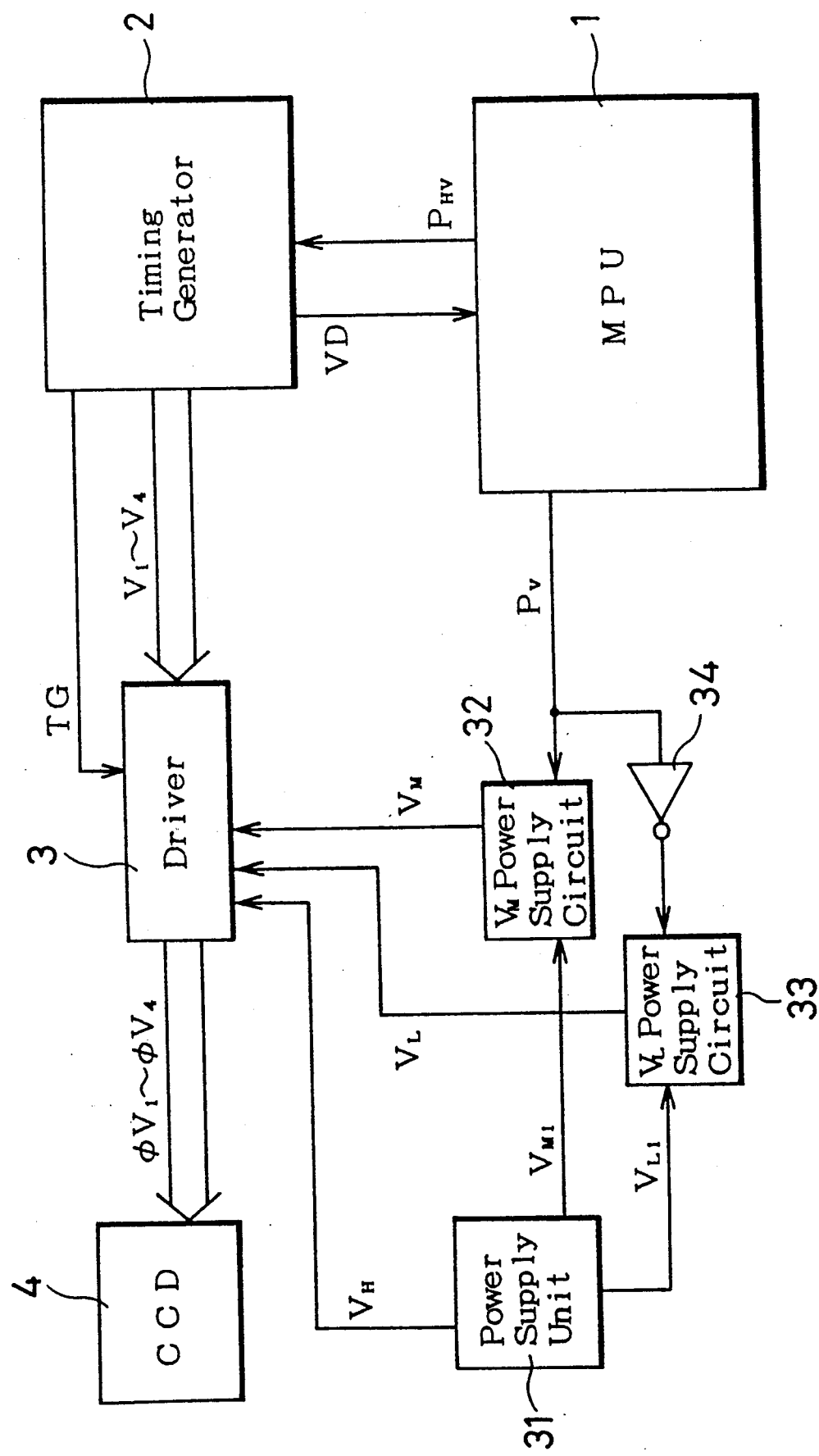
FIG. 1 is a block diagram showing a construction of a first embodiment of a device for operating a charge transfer device according to the present invention.

The present invention will now be described with reference to embodiments shown in the drawings.

FIG. 1 is a block diagram showing a construction of a first embodiment of a device for operating a charge transfer device according to the present invention. In this drawing, a micro processor (MPU) 1 controls an operation of each circuit. Namely, a timing generator 2 is controlled by the MPU 1 to generate signals $V_1$ through $V_4$ and a signal TG, as timing signals, and a driver 3 generates control signals $\phi V_1$ through $\phi V_4$ in accordance with the timing signals $V_1$ through $V_4$, and outputs the control signals $\phi V_1$ through $\phi V_4$ to a CCD 4, which is a charge transfer device operated in accordance with these control signals. A power supply circuit includes a power supply unit 31, a $V_M$ power supply circuit 32, and a $V_L$ power supply circuit 33, and supplies a first voltage $V_H$, a second voltage $V_M$ or a third voltage $V_L$ to the driver 3. The $V_M$ power supply circuit 32 and the $V_L$ power supply circuit 33 are controlled by the MPU 1, and an inverter 34, which inverts the polarity of the signals, is connected between the MPU 1 and the $V_L$ power supply circuit 33.

The power supply unit 31 generates the first voltage $V_H$, a fourth voltage $V_{M1}$, and a fifth voltage $V_{L1}$, respectively. The first voltage $V_H$ is supplied directly to the driver 3; the fourth voltage $V_{M1}$ is supplied to the $V_M$ power supply circuit 32, and is changed to the second voltage $V_M$ to be supplied to the driver 31. The fifth voltage $V_{L1}$ is supplied to the $V_L$ power supply circuit 32, and is changed to the third voltage $V_L$ to be supplied to the driver 3. Among these voltages $V_H$, $V_M$ and $V_L$, the first voltage $V_H$ has the highest value, and the third voltage $V_L$ has the lowest value. The second voltage $V_M$ has an intermediate value, between the values of the first and second voltages $V_H$ and $V_L$.

Figure 2:
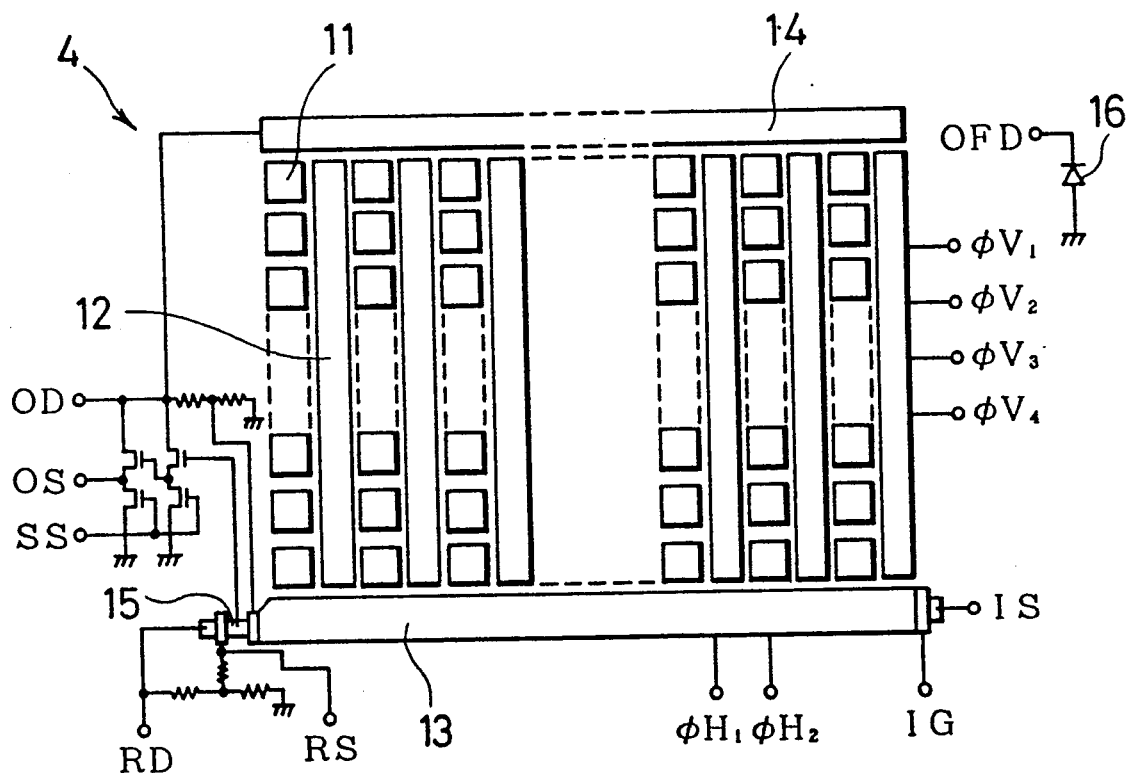
FIG. 2 is a block diagram showing a construction of an interline type CCD.

FIG. 2 shows a construction of an interline type CCD as the CCD 4. In this drawing, photodiode 11, which corresponds to each pixel, of the CCD 4 outputs an electric charge corresponding to the amount of light entering thereto. A vertical transfer CCD 12 is provided adjacent to the linear array of the photodiodes 11, and transfers an electric charge generated at the photodiodes 11 to a horizontal transfer CCD 13 or a discharge drain 14. A floating diffusion amplifier (FDA) 15 is connected to the horizontal transfer CCD 13, and changes an electric charge transferred from the horizontal transfer CCD 13 to a voltage, and outputs this voltage. An overflow drain 16 is provided for discharging an overflow of electric charges due to an excessive irradiation of light.

Figure 3:
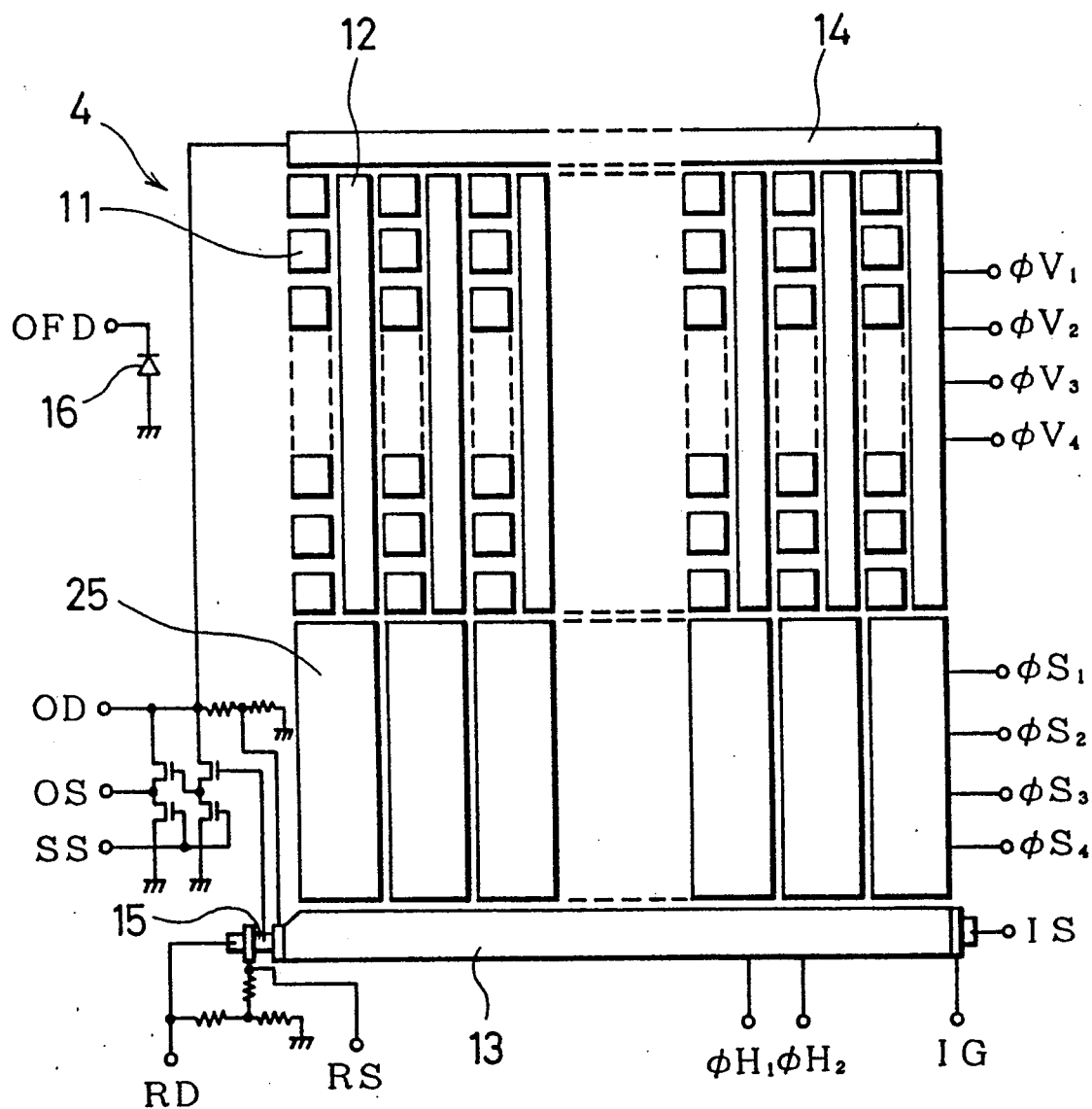
FIG. 3 is a block diagram showing a construction of a frame interline transfer type CCD.

The CCD 4 may be a frame interline transfer (FIT) type CCD as shown in FIG. 3, instead of the interline type CCD shown in FIG. 2. In this FIT type CCD 4, a memory area 25 is provided to store electric charges transferred from the vertical transfer CCD 12, and the electric charges stored in the memory area 25 are successively outputted to the horizontal transfer CCD 13.

Figure 4:
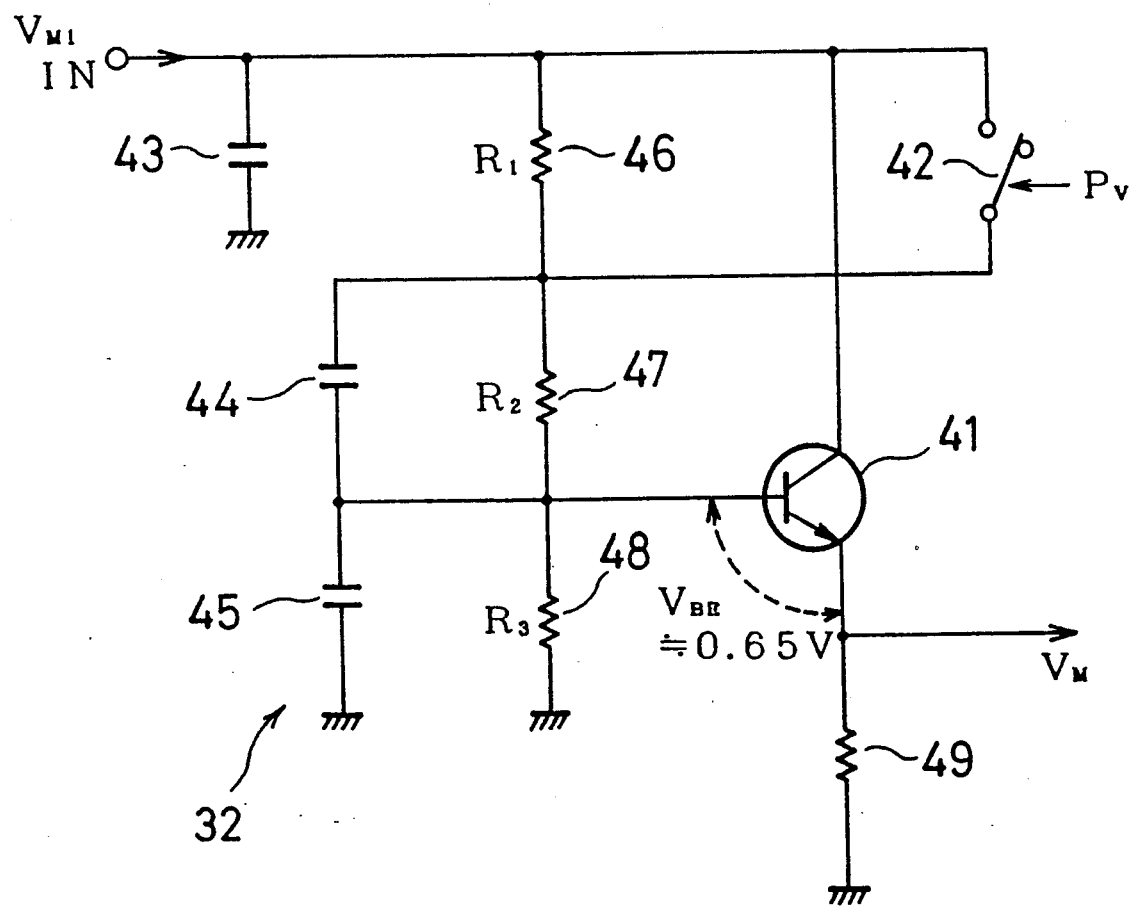
FIG. 4 is a block diagram showing a construction of a $V_M$ power supply circuit.

FIG. 4 shows a construction of the $V_M$ power supply circuit 32. In this drawing, capacitor 43 smooths the fourth voltage $V_{M1}$ inputted from the power supply unit 31, and outputs the smoothed fourth voltage $V_{M1}$ to a voltage divider constructed by resistors 46 through 48 and capacitors 44 and 45. A connecting point of resistor 47 and the resistor 48 is connected to a base of NPN transistor 41, in which an emitter is grounded through resistor 49, and a collector is connected to capacitor 43. The second voltage $V_M$ is outputted by the emitter of the NPN transistor 41. A switch 42 is connected in parallel to resistor 46, and turned ON or OFF by a signal $P_V$ outputted by the MPU 1.

Figure 5:
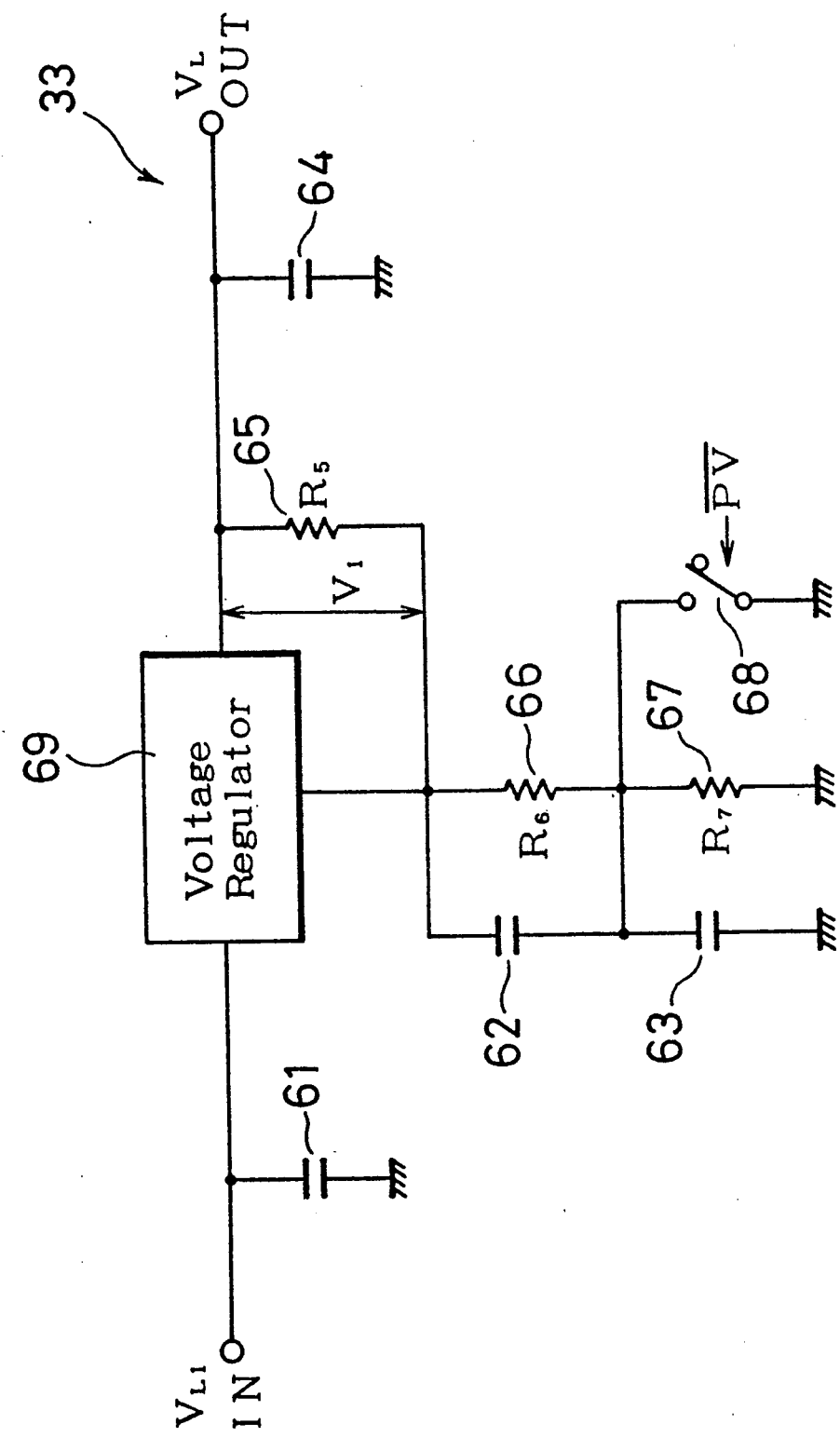
FIG. 5 is a block diagram showing a construction of a $V_L$ power supply circuit.

FIG. 5 shows a construction of the $V_L$ power supply circuit 33. In this drawing, capacitor 61 smooths the fifth voltage $V_{L1}$ inputted from the power supply unit 31, and supplies the smoothed fifth voltage $V_{L1}$ to a voltage regulator 69, which changes the voltage $V_{L1}$ to the voltage $V_1$ and outputs the voltage $V_1$. This voltage $V_1$ is changed to the voltage $V_L$ by a bias circuit constructed by resistors 65 through 67 and capacitors 62 and 63, and outputted through a smoothing capacitor 64. A switch 68 is connected in parallel to resistor 67, and turned ON and OFF by a signal which is obtained by inverting the signal $P_V$ outputted from the MPU 1 by the inverter 34.

FIG. 6 shows a construction of the driver 3. In this drawing, a switch 81 is switched between terminals A and B, so that the first voltage $V_H$ is selected when a signal obtained by inverting a signal TG by an inverter 84 is high level, and the second voltage $V_M$ is selected when a signal obtained by inverting a signal TG by an inverter 84 is low level. A switch 82 selects one of a voltage supplied from the switch 81 to a terminal A of the switch 82, and the third voltage $V_L$ supplied to a terminal B of the switch 82, and outputs the selected voltage as the control signal $\phi V_1$. The switch 82 is switched to terminal A when a signal obtained by inverting the timing signal $V_1$ by an inverter 85 is a HIGH level, and switched to the terminal B when the timing signal $V_1$ is a LOW level.

The second voltage $V_M$ and the third voltage $V_L$ are applied to terminals A and B of a switch 83, respectively, and one of the voltages selected by the switch 83 is outputted as the control signal $\phi V_2$. The switch 83 is switched to terminal A when a signal obtained by inverting the timing signal $V_2$ is HIGH level, and switched to terminal B when the timing signal $V_2$ is LOW level.

A circuit for generating the control signal $\phi V_3$ and $\phi V_4$, based on the timing signals $V_3$ and $V_4$, has a construction similar to that shown in FIG. 6. In this case, the signals $V_1$ and $V_2$ correspond to the signals $V_3$ and $V_4$, respectively.

An operation of the first embodiment is described below with reference to the timing charts shown in FIG. 7. In FIGS. 7 (c), (e), (f) and (g), the voltages $V_M$ and $V_L$ are shown on an enlarged scale.

First, an operation is described in which the charge transfer device 4 is operated at a low speed to output video signals corresponding to electric charges accumulated at the photodiodes 11.

When a timing signal TG (FIG. 7 (b)) is outputted by the timing generator 2 to be inputted to the driver 3, the highest voltage $V_H$ (FIG. 7 (b)) is selected from among the voltages supplied from the power supply circuit including the power supply unit 31, the $V_M$ power supply circuit 32, and the $V_L$ power supply circuit 33. Then, driver 3 generates the control signals $\phi V_1$ or $\phi V_3$ having the voltage $V_H$, which correspond to signals $V_1$ or $V_3$ generated by the timing generator 2, and outputs the control signals $\phi V_1$ or $\phi V_3$ to the CCD 4. As a result, electric charges accumulated at the photodiodes 11 are transferred to the vertical transfer CCD 12 adjacent thereto.

The driver 3 generates the control signals $\phi V_1$ through $\phi V_4$ corresponding to the signals $V_1$ through $V_4$ inputted from the timing generator 2, and outputs the control signals $\phi V_1$ through $\phi V_4$ (FIG. 7 (b)) to the CCD 4. The electric charges transferred to the vertical transfer CCD 12 are successively transferred to the horizontal transfer CCD 13, in accordance with the control signals $\phi V_1$ through $\phi V_4$. When the timing signals TG is not inputted to the driver 3, the control signals $\phi V_1$ through $\phi V_4$ are changed to signals represented by two values, i.e., the lowest voltage $V_L$ and the intermidiate voltage $V_M$ between the voltages $V_L$ and $V_H$.

The horizontal transfer CCD 13 receives signals $\phi H_1$ and $\phi H_2$ from a horizontally operating driver (not shown). As a result, the electric charges transferred to the horizontal transfer CCD 13 are inputted to the FDA 15 and changed to voltages to be read out.

Accordingly, electric charges accumulated at the photodiodes 11 corresponding to pixels, in accordance with an image to be formed, are outputted from the CCD 4 as video signals.

In a state in which the CCD 4 is operated at a low speed as described above, signal $P_V$ outputted by the MPU 1 to the $V_M$ power supply circuit 32 is LOW level (FIG. 7 (d)). Therefore, switch 42 of the $V_M$ power supply circuit 32 is turned OFF. Accordingly, assuming that resistors 46 through 48 have resistance values $R_1$ through $R_3$, respectively, a voltage $(R_3 V_{M1}/(R_1+R_2+R_3))$, which is obtained by dividing the voltage $V_{M1}$ by resistors $R_1$ and $R_2$ and the resistor $R_3$, is supplied to the base of NPN transistor 41. Therefore, assuming that a voltage between the emitter and the base of NPN transistor 41 is $V_{BE}$, the voltage $V_M$ outputted by the emitter is:

$$V_M = R_3 V_{M1}/(R_1+R_2+R_3) - V_{BE} \quad (1)$$

On the other hand, signal $P_V$ outputted by the MPU 1 is inverted by the inverter 34, so that a signal having a HIGH level is inputted to the $V_L$ power supply circuit 33. Therefore, switch 68 of the $V_L$ power supply circuit 33 is turned ON. Accordingly, resistor 67 is short-circuited and resistor 66 is grounded through the switch 68. Therefore, assuming that resistors 65 and 66 have resistance values $R_5$ and $R_6$, respectively, the voltage outputted by the $V_L$ power supply circuit 33 is:

$$V_L = V_1(1+R_6/R_5) \quad (2)$$

The voltage $V_M$, generated as described above is supplied to terminal B of switch 81, and to terminal A of switch 83, in the driver 3; the voltage $V_L$ is supplied to terminal B of the switch 82, and the terminal B of the switch 83, in the driver 3; and voltage $V_H$ outputted by power supply unit 31 is supplied to terminal A of switch 81.

As described above, control signals $\phi V_1$ through $\phi V_4$ are generated in the driver 3 in accordance with the timing signals TG, $V_1$ through $V_4$ outputted by the timing generator 2. Thus, the CCD 4 is operated at a low speed to output video signals.

Since the operation speed of the CCD 4 is low, an impedance based on the equivalent capacitance of the vertical transfer CCD 12 of the CCD 4 is relatively low. Therefore, the voltage drop caused by the impedance is relatively small. Accordingly, the voltages $V_M$ and $V_L$, as HIGH or LOW level signals of the signals $\phi V_1$ through $\phi V_4$ are maintained at approximately the predetermined values (FIGS. 7 (b), (e), and (g)).

An operation in which the charge transfer device 4 is operated at a high speed, so that the vertical transfer CCD 12 discharges unwanted electric charges to the discharge drain 14, is described below.

In this operation, the timing generator 2 outputs a vertical synchronization signal VD (FIG. 7(a)) to the MPU 1. The MPU 1 then outputs a signal $P_{HV}$ to the timing generator 2, in synchronization with the signal VD, as a high speed operation instruction. Upon receiving the signal $P_{HV}$, the timing generator 2 outputs the timing signals $V_1$ through $V_4$, at a high speed and in a reverse phase of the usual low speed operation. Namely, the timing signals are outputted in the order $V_1$ through $V_4$ for the low speed operation, and outputted in the order $V_4$ through $V_1$ for the high speed operation. The driver 3 outputs the control signals $\phi V_1$ through $\phi V_4$ at a high speed and in a reverse phase of the low speed operation. As a result, electric charges in the vertical transfer CCD 12 are transferred to the discharge drain 14 and discharged.

In a state in which the CCD 4 is operated at a high speed, the MPU 1 changes the signal $P_V$ (FIG. 7 (d)) to a high level, and outputs the same to the $V_M$ power supply circuit 32 and the $V_L$ power supply circuit 33.

Therefore, in the $V_M$ power supply circuit 32, switch 42 is turned on, so that resistance 46 is short-circuited. As a result, the resistance value $R_1$ in the equation (1) becomes 0. Therefore, the voltage $V_M$ outputted by the $V_M$ power supply circuit 32 is:

$$V_M = R_3 V_{M1}/(R_2+R_3) - V_{BE} \quad (3)$$

Comparing equation (3) with equation (1), since the denominator of the first term of equation (3) is smaller than that of equation (1), voltage $V_M$ is increased in equation (3) in comparison with equation (1). The amount of increase corresponds to a lowered value of the voltage caused by a change of the impedance during the high speed operation; the impedance including a resistance of a line connecting the power supply circuit to the driver 3 and an equivalent capacitance of the CCD 4. Therefore, if voltage $V_M$ expressed by the equation (1) is outputted during the high speed operation, as in a conventional device, a drop of voltage $V_M$ occurs, as shown in FIG. 7 (c). In this embodiment, however, since the voltage $V_M$ is supplemented by the amount of voltage drop, voltage $V_M$ remains at approximately the same value as during the low speed operation, as shown in FIG. 7 (e).

On the other hand, in the $V_L$ power supply circuit 33, since an output of the inverter 34 becomes a low level when the signal $P_V$ outputted by the MPU 1 becomes a high level, switch 68 is turned OFF. Therefore, assuming that the resistor 67 has a resistance value $R_7$, voltage $V_L$ outputted by the $V_L$ power supply circuit 33 is:

$$V_L = V_1(1+(R_6+R_7)/R_5) \quad (4)$$

Comparing equation (4) with equation (2), the absolute value of the voltage $V_L$ in equation (4) is larger than that of equation (2). But, since voltage $V_L$ has a negative value, the voltage $V_L$ in equation (4) is lowered by a value corresponding to the resistance value $R_7$.

The amount by which the voltage $V_L$ in lowered corresponds to an increase in the value of a voltage caused by a change of the impedance during the high speed operation; the impedance including a resistance of a line connecting the power supply circuit to the driver 3 and an equivalent capacitance of the CCD 4. Therefore, if the voltage $V_L$ expressed by equation (2) is outputted during the high speed operation, as in a conventional device, the voltage $V_L$ is raised, as shown in FIG. 7 (f). In this embodiment, however, since the voltage $V_L$ is corrected by this voltage raise, voltage $V_L$ remains at approximately the same value as during the low speed operation, as shown in FIG. 7 (g).

As described above, according to this embodiment, the voltage $V_M$ as a high level signal and the voltage $V_L$ as a low level signal, corresponding to the control signals $\phi V_1$ through $\phi V_4$ generated by the driver 3 during the high speed operation, are approximately the same as the voltage generated during the low speed operation. Therefore, the efficiency of a transfer of electric charges from the vertical transfer CCD 12 to the discharge drain 14 is improved. Thus all unwanted electric charges are discharged to the discharge drain 14. Accordingly, the image quality is improved. Furthermore, since this embodiment is not provided with a capacitor having a large capacity, the size of the embodied device is not enlarged.

Note that, if the frame interline transfer type CCD, as shown in FIG. 3 is provided as the CCD 4 in a conventional device, the transfer efficiency is remarkably lowered during the high speed operation. According to the embodiment of the present invention, however, any lowering of the transfer efficiency is completely prevented also in the case of the frame interline transfer type CCD.

Figure 8:
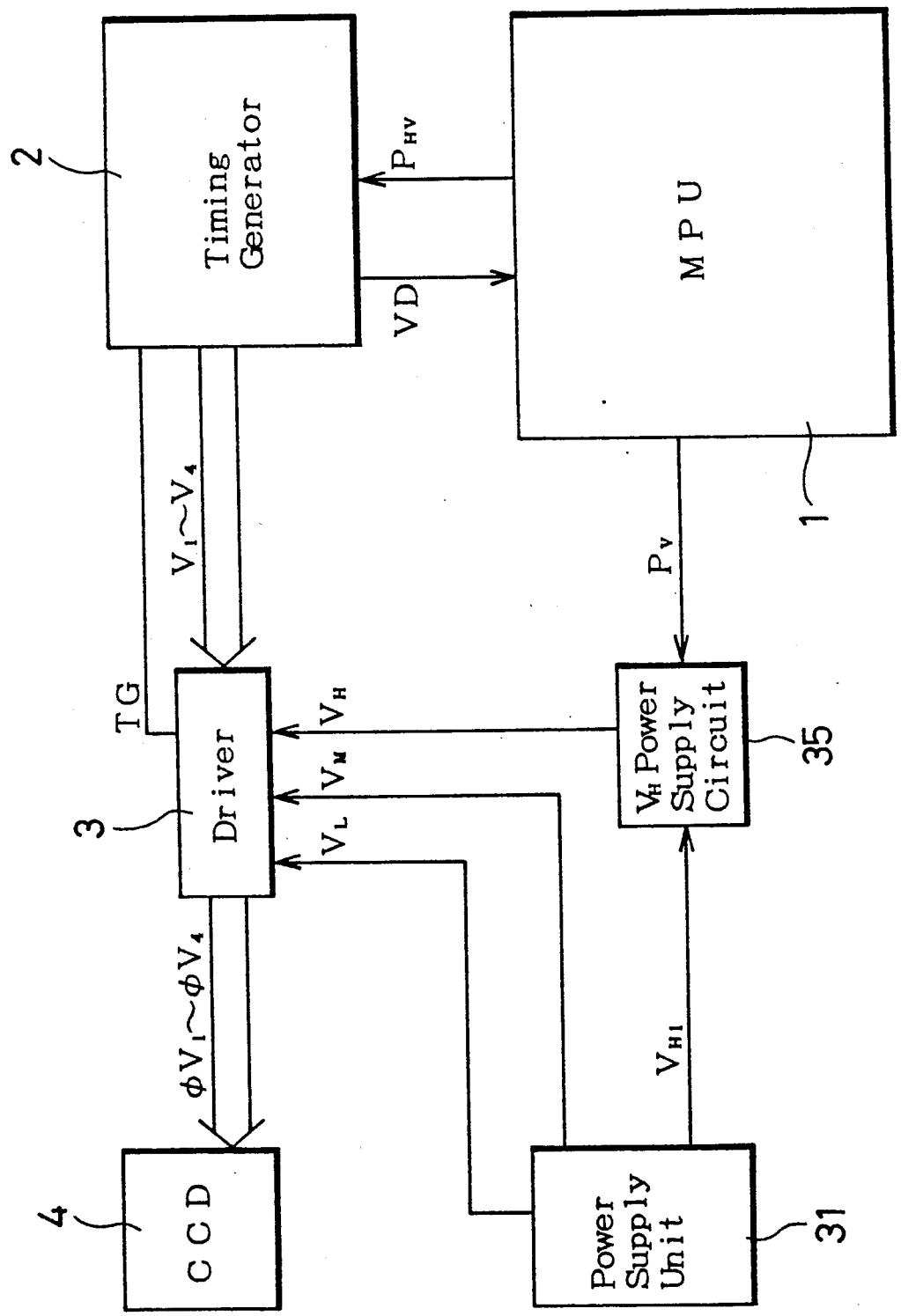
FIG. 8 is a block diagram showing a construction of a second embodiment of the present invention.

FIG. 8 is a block diagram showing a construction of a second embodiment of the present invention. In this drawing, the same or corresponding parts are given the same reference numerals as in FIG. 1.

In the second embodiment, a power supply circuit includes a power supply unit 31 and a $V_H$ power supply circuit 35, and supplies a first voltage $V_H$, a second voltage $V_M$ or a third voltage $V_L$ to the driver 3. The $V_H$ power supply circuit 35 is controlled by the MPU 1, and generates the first voltage $V_H$. The power supply unit 31 generates the second voltage $V_M$, the third voltage $V_L$ and the sixth voltage $V_{H1}$ respectively. The second and third voltages $V_M$ and $V_L$ are supplied to the driver 3. The sixth voltage $V_{H1}$ is supplied to the $V_H$ power supply circuit 35, and is changed to the first voltage $V_H$ to be supplied to the driver 3. Among these voltages $V_H$, $V_M$ and $V_L$, the first voltage $V_H$ has the highest value, and the third voltage has the lowest value. The second voltage $V_M$ has an intermediate value between those of the first and second voltages.

Figure 9:
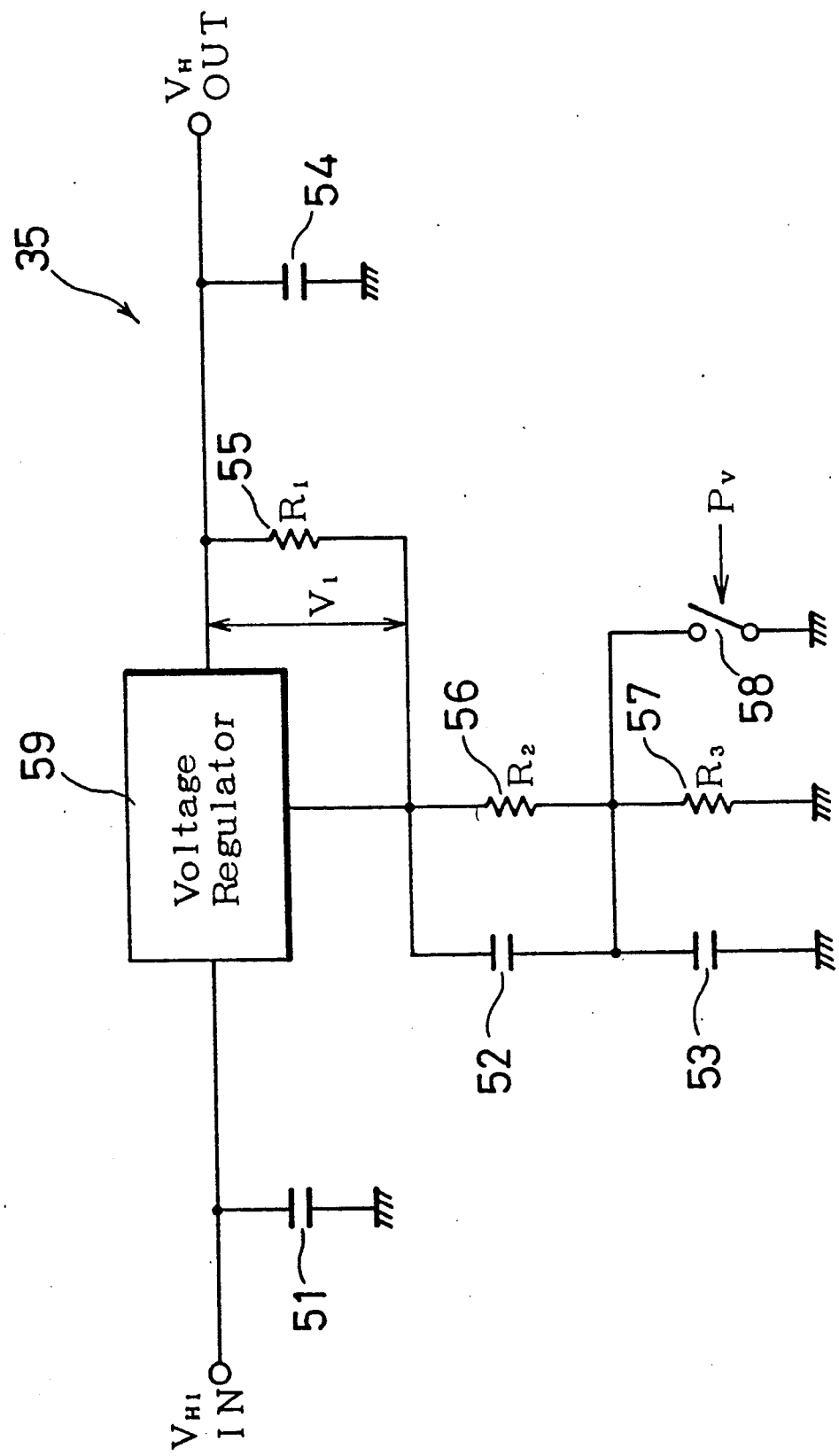
FIG. 9 is a block diagram showing a construction of a $V_H$ power supply, circuit.

FIG. 9 shows a construction of the $V_H$ power supply circuit 35. This construction is basically the same as that of the $V_L$ power supply circuit 33 in the first embodiment shown in FIG. 5. Namely, capacitor 51 smooths the sixth voltage $V_{H1}$ inputted from the power supply unit 31, and supplies voltage $V_{H1}$ to a voltage regulator 59, which changes voltage $V_{H1}$ to voltage $V_1$ and outputs the voltage $V_1$. This voltage $V_1$ is changed to voltage $V_H$ by a bias circuit constructed by resistors 55 through 57 and capacitors 52 and 53, and outputted through a smoothing capacitor 54. Switch 58 is connected in parallel to resistor 57, and turned ON or OFF by a signal $P_V$ outputted by the MPU 1.

The other circuits are the same as the first embodiment shown in FIG. 1. Namely, the driver 3 has the same construction as shown in FIG. 6, and the CCD 4 can be an interline type CCD, as shown in FIG. 2 or a frame interline transfer FIT type CCD, as shown in FIG. 3.

An operation of the second embodiment is described below with reference to a timing chart shown in FIG. 10.

An operation during which the charge transfer device 4 is operated at a low speed to output video signals corresponding to electric charges accumulated at the photodiodes 11, and an operation during which the charge transfer device 4 is operated at a high speed, so that the vertical transfer CCD 12 discharges unwanted electric charges to the discharge drain 14, are basically the same as described for the first embodiment. Therefore, only a part of the above operation, that is different from that of the first embodiment, is described below.

In a state in which the CCD 4 is operated at a low speed, a signal $P_V$ (FIG. 10(d)) outputted by the MPU 1 to the $V_H$ power supply circuit 35 is a LOW level. Therefore, switch 58 of the $V_H$ power supply circuit 35 is turned ON, whereby the resistor 57 is short-circuited and one end of resistor 56 is grounded through switch 58. As a result, assuming that resistors 55 and 56 have resistance values $R_1$ and $R_2$, respectively, a voltage $V_H$ outputted by the $V_H$ power supply circuit 35 is:

$$V_H = V_1(1 + R_2/R_1) \tag{5}$$

The voltage $V_H$ generated as described above is applied to terminal A of switch 81 of the driver 3 (FIG. 6). The voltage $V_M$ outputted by the power supply unit 31 is applied to terminals B of switch 81 and terminal A of switch 83 of the driver 3. The voltage $V_L$ outputted by the power supply unit 31 is applied to terminals B of switches 82 and 83 of the driver 3, respectively.

As in the first embodiment, the control signals $\phi V_1$ through $\phi V_4$ are generated in the driver 3 in accordance with the signal TG and the signals $V_1$ through $V_4$, thus, the CCD 4 is operated at a low speed. The signal TG is a first timing signal outputted by the timing generator 2, and the signals $V_1$ through $V_4$ are second timing signals outputted by the timing generator 2.

Since the operation speed of the CCD 4 is low, an impedance based on the equivalent capacitance of the vertical transfer CCD 12 of the CCD 4 is relatively low. Therefore, the voltage drop caused by the impedance is relatively small. Accordingly, voltages $V_H$ is maintained at approximately a predetermined value (FIG. 10 (e)).

An operation during which the charge transfer device 4 is operated at a high speed so that the vertical transfer CCD 12 discharges unwanted electric charges to the discharge drain 14, is described below.

Since the equivalent capacitance of the vertical transfer CCD 12 and an electric current flowing in the driver 3 during the high speed operation are relatively large, the voltage drop during the high speed operation is large in comparison with that occurring in the low speed operation. As a result, during the high speed operation, voltage $V_H$ becomes lower than during the low speed operation (FIGS. 10 (c) and (e)). Although voltage $V_H$ is returned to the original level when the high speed operation is stopped, due to the equivalent capacitance of the vertical transfer CCD 12, the recovery of the voltage takes some time.

When an electronic shutter is operated, a transfer of electric charges accumulated at the photodiodes 11 to the vertical transfer CCD is carried out immediately after the electric charges are discharged during the high speed operation. In a conventional device, the signal TG having the voltage $V_H$ is generated before the voltage $V_H$ is fully returned to the original value (FIG. 10 (c)), thus, the level of the signal TG is slightly lower than the original value, by $\Delta V_H$ (FIG. 10 (b)). Accordingly, electric charges are not fully discharged from the photodiodes 11 to the vertical transfer CCD 12. Therefore, some electric charges may remain at the photodiodes 11. This causes a deterioration of the image. According to this second embodiment, however, the level of the signal TG is fully returned to the original value immediately after the high speed operation is carried out. Thus, a high quality image is maintained, as described below.

When the timing generator 2 outputs a vertical synchronization signal VD (FIG. 10 (a)) to the MPU 1, the MPU 1 outputs a signal $P_{HV}$ to the timing generator 2, in synchronization with the signal VD, as a high speed operation instruction. Upon receiving the signal $P_{HV}$, the timing generator 2 outputs the timing signals $V_1$ through $V_4$ at a high speed and in a reverse phase of the usual low speed operation. Namely, the timing signals are outputted in the order $V_1$ through $V_4$ during the low speed operation, and outputted in the order $V_4$ through $V_1$ during the high speed operation. The driver 3 outputs the control signals $\phi V_1$ through $\phi V_4$ at a high speed and in a reverse phase of the low speed operation (FIG. 10 (b)). As a result, electric charges in the vertical transfer CCD 12 are transferred to the discharge drain 14 and discharged.

Immediately after this high speed operation, at the timing of outputting the signal TG, the MPU 1 inverts the signal $P_V$ to a LOW level (FIG. 10 (d)), and as a result, the switch 58 of the $V_H$ power supply circuit 35 is turned OFF, so that the short-circuit of resistor 57 is released. Accordingly, assuming that resistor 57 has a resistance value $R_3$, voltage $V_H$ outputted by the $V_H$ power supply circuit 35 is:

$$V_H = V_1(1 + (R_2 + R_3)/R_1) \quad (6)$$

Comparing equation (6) with equation (5), since the voltage has a positive value, the voltage of equation (6) is larger than that of equation (5), i.e., the absolute value of $V_H$ of equation (6) is larger than that of equation (5). The amount of increase corresponds to a lowering of the value of the voltage caused by a change of the impedance during the high speed operation; the impedance including an equivalent capacitance of the CCD 4.

Therefore, if voltage $V_H$ expressed by equation (5) is outputted during the high speed operation, as in a conventional device, voltage $V_H$ is dropped, as shown by $\Delta V_H$ in FIG. 10 (b). In this embodiment, however, since voltage $V_H$ is supplemented by the amount of voltage drop, voltage $V_H$ remains approximately the same as the value thereof during the low speed operation, as shown in FIGS. 10 (b) and (e).

As described above, the second embodiment is constructed in such a manner that, when the first timing signal is outputted immediately after the high speed operation is carried out, voltage $V_H$ is supplemented and has a different value from the value thereof during the low speed operation. Therefore, a drop in the level of the first timing signal is prevented, and a high quality image is obtained. Further, since this embodiment is not provided with a capacitor having a large capacity, the size of the embodied device is not enlarged.

Although the embodiments of the present invention have been described herein with reference to the accompanying drawings, obviously many modifications and changes may be made by those skilled in this art without departing from the scope of the invention.

I claim:

1. A device for operating a charge transfer device, comprising:
   a driver for operating said charge transfer device, in accordance with timing signals; at a low speed or at a high speed,
   a power supply circuit for supplying a varying voltage to said driver; and
   means for controlling said power supply circuit so that said supplied varying voltage is changed in accordance with said low speed or said high speed state in which said charge transfer device is operated.

2. A device according to claim 1, wherein said control means controls said power supply circuit so that a voltage supplied during a period in which said charge transfer device is operated at a high speed has a different value from a voltage supplied during a period in which said charge transfer device is operated at a low speed.

3. A device according to claim 2, wherein said control means controls said power supply circuit so that an absolute value of said voltage supplied during a period in which said charge transfer device is operated at a high speed is larger than an absolute value of said voltage supplied during a period in which said charge transfer device is operated at a low speed, by a lowered value of a voltage caused by a change of an impedance which includes a resistance of a line connecting said power supply circuit to said driver and an equivalent capacitance of said charge transfer device.

4. A device according to claim 1, wherein said power supply circuit includes a power supply unit for supplying a first voltage to said driver, a $V_M$ power supply circuit for supplying a second voltage to said driver, and a $V_L$ power supply circuit for supplying a third voltage to said driver.

5. A device according to claim 4, wherein said power supply unit generates a fourth voltage which is changed to said second voltage by said $V_M$ power supply circuit, and a fifth voltage which is changed to said third voltage by said $V_L$ power supply circuit.

6. A device according to claim 4, wherein resistances of said $V_M$ power supply circuit and said $V_L$ power supply circuit are changed by said control means, respectively.

7. A device according to claim 1, wherein said timing signals include a first timing signal for transferring electric charges from a photodiode to said charge transfer device and a second timing signal for causing said charge transfer device to successively transfer said electric charges.

8. A device according to claim 7, wherein said control means controls said power supply circuit, when said first timing signal is generated immediately after said charge transfer device is operated at a high speed in accordance with said second timing signal, whereby said voltage supplied during said high speed operation is different from said voltage supplied immediately after said charge transfer device is operated at a low speed.

9. A device according to claim 8, wherein said control means controls said power supply circuit, when said first timing signal is generated immediately after said charge transfer device is operated at a high speed in accordance with said second timing signal, whereby said voltage supplied during said high speed operation is larger than said voltage supplied immediately after said charge transfer device is operated at a low speed, by a lowered value of the voltage caused by a change of impedance which includes an equivalent capacitance of said charge transfer device.

10. A device according to claim 7, wherein said power supply circuit includes a $V_H$ power supply circuit for supplying a first voltage to said driver, and a power supply unit for supplying a second voltage to said driver.

11. A device according to claim 10, wherein said power supply unit generates a third voltage which is changed to said first voltage by said $V_H$ power supply circuit.

12. A device according to claim 11, wherein a resistance of said $V_H$ power supply circuit is changed by said control means.

13. A device for operating a charge transfer device, comprising:
    means for generating first and second timing signals;
    a driver for operating said charge transfer device, in accordance with said timing signals, at a low speed state or at a high speed state;
    a power supply circuit for supplying a varying voltage to said driver;
    means for controlling said power supply circuit so that said varying voltage is changed in accordance with said low speed or said high speed state in which said charge transfer device is operated.

14. A device for operating a charge transfer device, comprising:
    means for generating first and second timing signals;
    a driver for operating said charge transfer device, in accordance with said timing signals, at a low speed state or at a high speed state;
    a power supply circuit for supplying a varying voltage to said drivers.
    means for controlling said power supply circuit so that said varying voltage is changed in accordance with said low speed or said high speed state at which a vertical transfer CCD of said charge transfer device is operated.

15. A device for operating a charge transfer device, comprising:
    means for generating different speed timing signals by which said charge transfer device is operated;
    a driver for operating said charge transfer device in accordance with said timing signals outputted by said generating means;
    a power supply circuit for supplying different voltage levels to said driver; and
    means for controlling said power supply circuit so that said varying voltage is changed in accordance with said different speed timing signals in which said charge transfer device is operated.

16. The device for operating a charge transfer device according to claim 15, wherein said control means controls said power supply circuit so that an absolute value of said voltage supplied during a period of time in which said charge transfer device is operated at a high speed is larger than an absolute value of said voltage supplied during a period of time in which said charge transfer device is operated at a low speed.

17. The device for operating a charge transfer device according to claim 15, wherein said control means controls said power supply circuit so that an absolute value of said voltage supplied during a period of time in which said charge transfer device is operated at a high speed is larger than an absolute value of said voltage supplied during a period of time in which said charge transfer device is operated at a low speed, by a lowered value of said voltage caused by a change of an impedance which includes a resistance of a line connecting said power supply circuit to said driver and a capacitance of said charge transfer device.

18. A device for operating a charge transfer device, comprising:
    means for driving said charge transfer device at a plurality of speed state in response to an inputted timing signal;
    means for supplying a plurality of voltages to said driving means; and
    means for controlling said voltage supplying means so that said plurality of voltages supplied to said charge transfer device are changed in accordance with said plurality of speed states in which said charge transfer device is operated.

19. The device for operating a charge transfer device according to claim 18, wherein said voltage supplying means can supply a first voltage, a second voltage and a third voltage.

20. The device for operating a charge transfer device according to claim 18, wherein said inputted timing signal comprises a first timing signal for transferring electric charges from a photodiode to said charge transfer device, and a second timing signal for causing said charge transfer device to transfer said electric charges.

21. The device for operating a charge transfer device according to claim 18, wherein said control means changes a resistance of said voltage supplying means to cause a change in said plurality of speed states.

* * * * *

UNITED STATES PATENT AND TRADEMARK OFFICE
CERTIFICATE OF CORRECTION

PATENT NO. : 5,095,226
DATED : March 10, 1992
INVENTOR(S) : N. TANI

It is certified that error appears in the above-indentified patent and that said Letters Patent is hereby corrected as shown below:

On the title page item [56], "References Cited", "U.S. PATENT DOCUMENTS", insert ---4,819,070  4/1989  Hynecek  358/213.11---.

At column 12, line 30 (claim 18, line 4), change "state" to ---states---.

Signed and Sealed this

Fifteenth Day of October, 1996

Attest:

BRUCE LEHMAN

*Attesting Officer*  *Commissioner of Patents and Trademarks*